United States Patent
Seaman

(10) Patent No.: US 6,929,532 B1
(45) Date of Patent: Aug. 16, 2005

(54) METHOD AND APPARATUS FOR FILTERING A CHEMICAL POLISHING SLURRY OF A WAFER FABRICATION PROCESS

(75) Inventor: George H. Seaman, Gresham, OR (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/434,028

(22) Filed: May 8, 2003

(51) Int. Cl.[7] .................................. B24B 1/00
(52) U.S. Cl. .......................... 451/36; 451/60
(58) Field of Search ............... 451/36, 60, 99, 451/271, 446; 210/500.23

(56) References Cited

U.S. PATENT DOCUMENTS

| | | | |
|---|---|---|---|
| 5,154,827 A * | 10/1992 | Ashelin et al. | 210/490 |
| 5,158,680 A * | 10/1992 | Kawai et al. | 210/321.61 |
| 5,683,584 A * | 11/1997 | Wenthold et al. | 210/500.23 |
| 5,695,702 A * | 12/1997 | Niermeyer | 264/129 |
| 6,015,499 A * | 1/2000 | Hayden | 210/767 |
| 6,106,728 A * | 8/2000 | Iida et al. | 210/743 |
| 6,280,300 B1 * | 8/2001 | Komatsu et al. | 451/87 |
| 6,407,000 B1 * | 6/2002 | Hudson | 438/693 |
| 6,461,524 B1 * | 10/2002 | Tsuihiji et al. | 210/777 |
| 6,551,174 B1 * | 4/2003 | Brown et al. | 451/41 |
| 6,623,637 B1 * | 9/2003 | Monzen et al. | 210/321.74 |
| 6,659,848 B1 * | 12/2003 | Craig et al. | 451/60 |
| 6,679,764 B2 * | 1/2004 | Finkenzeller et al. | 451/60 |
| 2004/0014403 A1 * | 1/2004 | Oberkampf et al. | 451/60 |

OTHER PUBLICATIONS

Koch Membrane Systems, Electric Power Utility/Bottling/Microelectronics, 2001, pp. 4 and 5, via website.*

* cited by examiner

*Primary Examiner*—David B. Thomas
(74) *Attorney, Agent, or Firm*—Barnes & Thornburg

(57) ABSTRACT

A polishing slurry supply circuit for a semiconductor wafer fabrication process includes a tangential flow filter. The tangential flow filter is positioned upstream of a wafer polishing apparatus. The tangential flow filter may take the form of a hollow fiber filters or tubular filtration filters. Such filters may be embodied as either ultrafiltration cartridges or microfiltration cartridges. A method of operating a chemical-mechanical polishing system is also disclosed.

21 Claims, 3 Drawing Sheets

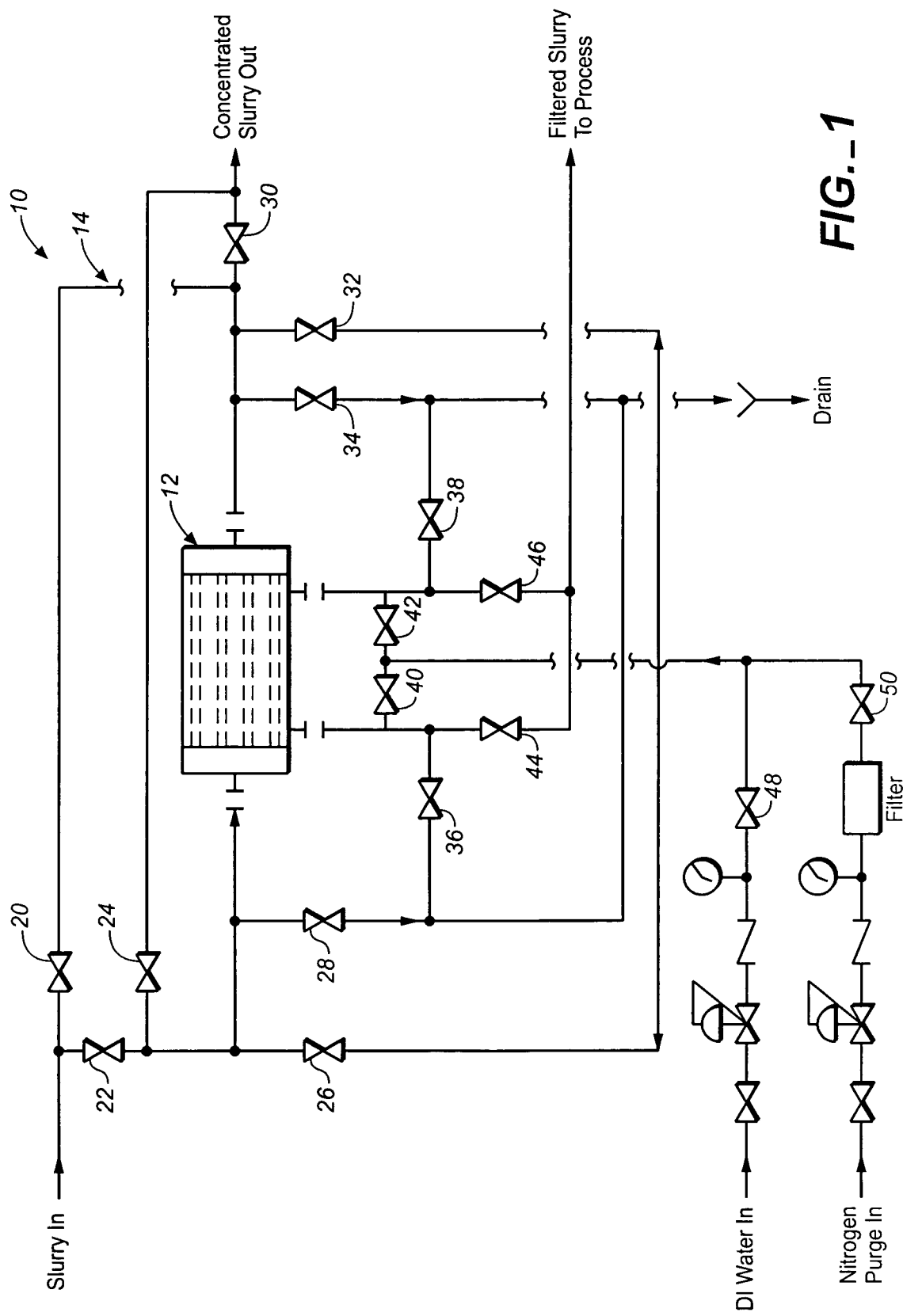
FIG._1

Valve Operations

| Operation | Valve Reference No. | | | | | | | | | | | | | | | |
|---|---|---|---|---|---|---|---|---|---|---|---|---|---|---|---|---|
| | 20 | 22 | 24 | 26 | 28 | 30 | 32 | 34 | 36 | 38 | 40 | 42 | 44 | 46 | 48 | 50 |
| Normal Flow | Closed | Open | Closed | Closed | Closed | Open | Closed | Closed | Closed | Closed | Closed | Closed | Closed | Open | Closed | Closed |
| Reverse Flow | Open | Closed | Open | Closed | Closed | Closed | Closed | Closed | Closed | Closed | Closed | Closed | Open | Closed | Closed | Closed |
| Nitrogen Rinse Forward | Closed | Closed | Closed | Open | Closed | Closed | Closed | Open | Closed | Open | Closed | Closed | Closed | Closed | Closed | Open |
| Nitrogen Rinse Reverse | Closed | Closed | Closed | Closed | Open | Closed | Open | Closed | Open | Closed | Closed | Closed | Closed | Closed | Closed | Open |
| Nitrogen Rinse Backwash Forward | Closed | Closed | Closed | Closed | Closed | Closed | Closed | Open | Closed | Closed | Open | Closed | Closed | Closed | Closed | Open |
| Nitrogen Rinse Backwash Reverse | Closed | Closed | Closed | Closed | Open | Closed | Closed | Closed | Closed | Closed | Closed | Open | Closed | Closed | Closed | Open |
| DI Rinse Forward | Closed | Closed | Closed | Open | Closed | Closed | Closed | Open | Closed | Open | Closed | Closed | Closed | Closed | Open | Closed |
| DI Rinse Reverse | Closed | Closed | Closed | Closed | Open | Closed | Open | Closed | Open | Closed | Closed | Closed | Closed | Closed | Open | Closed |
| DI Rinse Backwash Forward | Closed | Closed | Closed | Closed | Closed | Closed | Closed | Open | Closed | Closed | Open | Closed | Closed | Closed | Open | Closed |
| DI Rinse Backwash Reverse | Closed | Closed | Closed | Closed | Open | Closed | Closed | Closed | Closed | Closed | Closed | Open | Closed | Closed | Open | Closed |

FIG._2

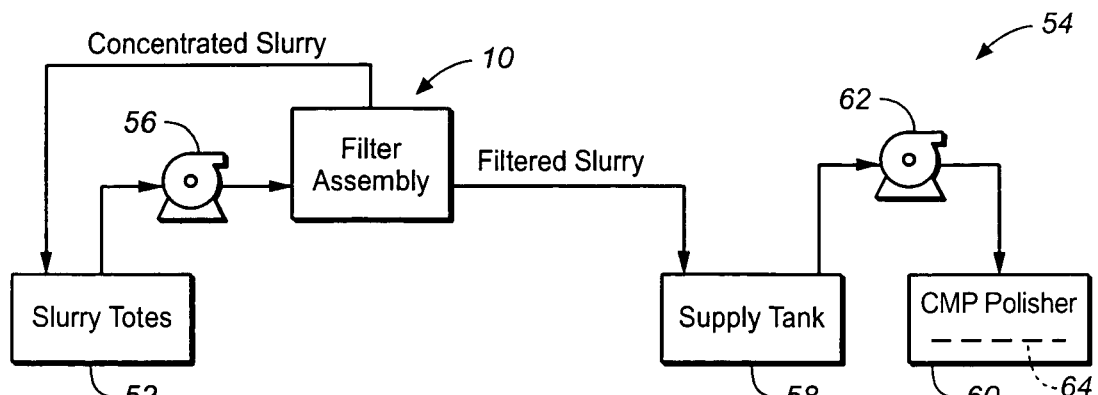
FIG._3
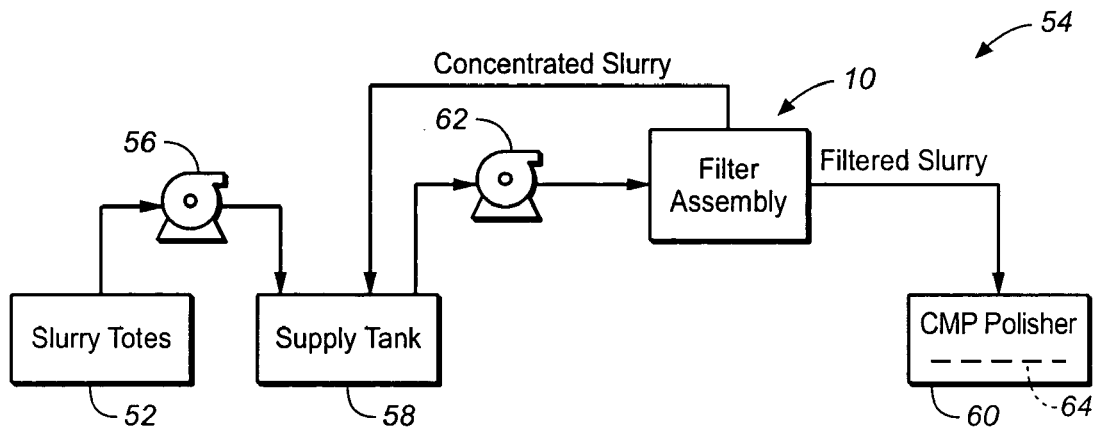
FIG._4
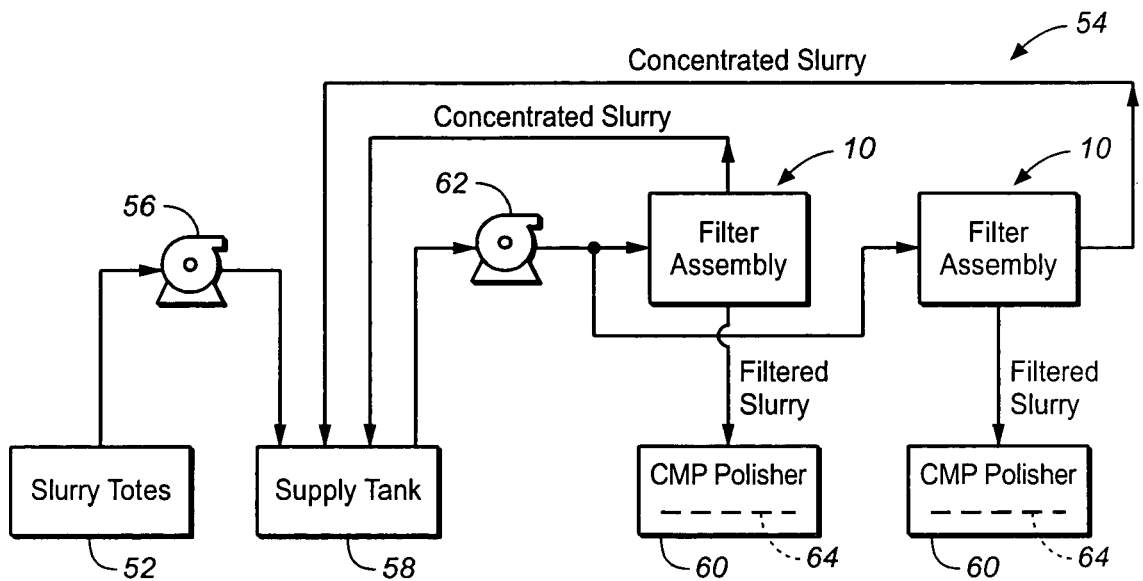
FIG._5

METHOD AND APPARATUS FOR FILTERING A CHEMICAL POLISHING SLURRY OF A WAFER FABRICATION PROCESS

FIELD OF THE DISCLOSURE

The present disclosure relates generally to semiconductor wafer fabrication, and more particularly to a method and apparatus for filtering a polishing slurry used in chemical-mechanical polishing.

BACKGROUND OF THE DISCLOSURE

Semiconductor integrated circuits are typically fabricated by a layering process in which several layers of material are fabricated on a surface of a wafer. This fabrication process typically requires subsequent layers to be fabricated upon a smooth, planar surface of a previous layer. However, the surface topography of layers may be uneven due to an uneven topography associated with an underlying layer. As a result, a layer may need to be polished in order to present a smooth, planar surface to a subsequent processing step. For example, an insulator layer may need to be polished prior to formation of a conductor layer or pattern on an outer surface thereof.

In general, a semiconductor wafer may be polished to remove high topography and surface defects such as scratches, roughness, or embedded particles of dirt or dust. The polishing process typically is accomplished with a polishing system that includes a wafer carrier and a polishing table between which the semiconductor wafer is positioned. The wafer carrier and the table are moved relative to each other thereby causing material to be removed from the surface of the wafer. The polishing process may also involve the introduction of a chemical slurry to facilitate higher removal rates, along with the selective removal of materials fabricated on the semiconductor wafer. This polishing process is generally referred to as chemical-mechanical planarization or chemical-mechanical polishing (CMP). The chemical slurry is generally an aqueous acidic or basic solution having a number of abrasive particles, such as silica ($SiO_2$), alumina ($Al_2O_3$), or ceria ($Ce_2O_3$) particles, suspended therein.

The size of the abrasive particles of the chemical polishing slurry is desirably within a range of, for example, 0.03–0.4 microns. However, the polishing slurry can often include larger particles which can lead to scratching of the wafer or other types of manufacturing problems. The large particles may be aggregates (i.e., multiple smaller particles chemically bonded to one another), agglomerates (i.e., "clumps" of particles or aggregates), or gels. Occasionally, the polishing slurry may also contain foreign particles which require removal from the slurry.

The conventional approach to remove large particles from a polishing slurry includes the use of a series of progressively tighter depth filters. A first depth filter having a 10 micron cutoff is followed by a number of progressively tighter filters down to a final depth filter located proximate the polishing tool having a cutoff in the range of 1.0–1.5 microns.

The use of such depth filters has a number of drawbacks associated therewith. For example, existing depth filters are not "absolute" filters—they only remove a portion of the particles greater than their micron cutoff. As such, a number of large particles escape the filters. Moreover, use of such filters is expensive since depth filters capture the particles on the filter surface (or inside the filter path), and, as a result, require replacement on a frequent basis.

SUMMARY OF THE DISCLOSURE

In accordance with one aspect of the present disclosure, there is provided a method of operating a chemical-mechanical polishing system in which a chemical polishing slurry is advanced through a tangential flow filter prior to being introduced onto a polishing surface. The tangential flow filter may take the form of a hollow fiber filter or a tubular filtration filter. Such filters may be embodied as either ultrafiltration cartridges or microfiltration cartridges.

In accordance with another aspect of the present disclosure, there is provided a polishing slurry supply circuit for a semiconductor wafer fabrication system. The supply circuit includes a tangential flow filter. The tangential flow filter is positioned upstream of a wafer polishing apparatus. The tangential flow filter may take the form of a hollow fiber filter or a tubular filtration filter. Such filters may be embodied as either ultrafiltration cartridges or microfiltration cartridges.

BRIEF DESCRIPTION OF THE DRAWINGS

FIG. 1 is a schematic view of a slurry filter assembly for use in a semiconductor wafer fabrication process;

FIG. 2 is a table showing the position of each of the flow valves of the filter assembly of FIG. 1 during performance of various operations;

FIG. 3 is a schematic view showing the slurry filter assembly of FIG. 1 being utilized to filter polishing slurry during removal of the slurry from shipping totes;

FIG. 4 is a schematic view similar to FIG. 3, but showing the slurry filter assembly of FIG. 1 being utilized to filter polishing slurry introduced into the slurry supply circuit from the supply tank; and FIG. 5 is a view similar to FIG. 3, but showing a slurry filter assembly of FIG. 1 being utilized at the inlet of each CMP polisher.

DETAILED DESCRIPTION OF THE DRAWINGS

While the disclosure is susceptible to various modifications and alternative forms, specific embodiments thereof have been shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the appended claims.

Referring now to FIG. 1, there is shown a slurry filter assembly 10 having a tangential flow filter 12. The tangential flow filter 12 may be embodied as any known type of tangential flow filter such as a hollow fiber filter or a tubular filtration filter. The tangential flow filter 12 may be configured as either a microfiltration filter or an ultrafiltration filter. For ease of implementation and replacement, the filter 12 may also be embodied as a filter cartridge which is removably positioned in a filter housing (not shown). Such microfiltration or ultrafiltration tangential flow filter cartridges are commercially available. In a specific exemplary embodiment, the tangential flow filter 12 may be embodied as any one of the numerous hollow fiber filter cartridges commercially available from Koch Membrane Systems, Incorporated of Wilmington, Mass.

The tangential flow filter 12 is configured to remove large particles from a flow of polishing slurry prior to introduction of the slurry onto a polishing surface of a CMP polisher. The filter 12 may be configured with a pore size or cutoff in the range of 0.25–0.75 microns depending on the type of polishing slurry being used. Other filter cutoffs may also be used to fit the needs of a given polishing system.

As shown in FIG. 1, the filter assembly 10 is configured in a cross flow arrangement. In such a way, the polishing slurry may be introduced into the flow filter 12 from either end thereof. The slurry having particles with a size less than the cutoff rating of the filter 12 (generally referred to as the filter's "permeate") passes through the filter's membrane and is thereafter directed to a subsequent component in the wafer fabrication process. The slurry having particles grater than the cutoff rating of the filter (generally referred to as the filter's "concentrate") flows through the filter housing without passing through the filter's membrane and is thereafter directed back to the source of the slurry (e.g., a supply tote or tank). Eventually, the slurry concentrate is sent to drain or otherwise disposed of.

Introduction of a reverse flow into the flow filter 12 allows the membrane of the flow filter 12 to be backwashed to remove any particles that may become trapped in the membrane. Moreover, the flow filter 12 may also from time-to-time be purged with fluids other than polishing slurry. For example, the flow filter 12 may be purged with DI water or nitrogen gas. Purging of the flow filter 12 with these fluids may be performed in either direction due to the cross flow arrangement of the filter assembly 10.

The filter assembly 10 includes a valve assembly 14 having a number of flow valves 20, 22, 24, 26, 28, 30, 32, 34, 36, 38, 40, 42, 44, 46, 48, and 50. Each of the flow valves of the valve assembly 14 may be independently controlled to allow for the various flow operations associated with the filter assembly. For example, the valve assembly 14 may be operated to allow for normal (i.e., forward) slurry flow, reverse slurry flow, forward nitrogen rinse flow, reverse nitrogen rinse flow, forward nitrogen rinse backwash flow, reverse nitrogen rinse backwash flow, forward DI water rinse flow, reverse DI water rinse flow, forward DI water rinse backwash flow, and reverse DI water rinse backwash flow. The valve chart shown in FIG. 2 indicates the position of each of the flow valves 20, 22, 24, 26, 28, 30, 32, 34, 36, 38, 40, 42, 44, 46, 48, and 50 during performance of the various flow operations associated with use of the filter assembly 10.

Referring now to FIG. 3, there is shown a polishing system utilizing the slurry filter assembly 10. In the case of the system of FIG. 3, the filter assembly 10 is utilized to filter the polishing slurry being pumped from a drum or tote 52 during introduction of the polishing slurry into a supply circuit 54. Unfiltered slurry is pumped through the filter assembly 10 by a pump 56. The filtered slurry (i.e., the permeate) exiting the filter assembly 10 is then advanced into a supply tank 58 associated with the supply circuit 54. The concentrated slurry from the filter assembly 10 (i.e., the slurry having particles larger than the filter's cutoff) is circulated back into the tote 52 and will eventually be discarded with the tote 52.

The filtered slurry in the supply tank 58 is pumped to a CMP polisher 60 by a pump 62. The filtered slurry is introduced onto a polishing surface 64 of the CMP polisher 60 for use in wafer polishing. The polishing surface 64 may be embodied as a polishing table (not shown) having a polishing pad (not shown) secured thereto. In a conventional manner, the polishing pad is typically made of cast polyurethane which protects the polishing table from the chemical polishing slurry and other chemicals introduced during the polishing process. A surface to be polished of a semiconductor wafer is advanced into contact with the polishing surface 64 during operation of the CMP polisher 60 thereby allowing for planarization of the wafer.

Referring now to FIG. 4, there is shown another polishing system utilizing the slurry filter assembly 10. In the case of the system of FIG. 4, the filter assembly 10 is utilized to filter the polishing slurry being pumped from the outlet of the supply tank 58 subsequent to introduction of the polishing slurry into the supply circuit 54. Unfiltered slurry is pumped through the filter assembly 10 by the pump 62. The filtered slurry (i.e., the permeate) exiting the filter assembly 10 is then advanced to the CMP polisher 60 for use in the polishing process. The concentrated slurry from the filter assembly 10 (i.e., the slurry having particles larger than the filter's cutoff) is circulated back into the tank 58 and will eventually be discarded.

Referring now to FIG. 5, there is shown yet another polishing system utilizing the slurry filter assembly 10. In the case of the system of FIG. 5, the filter assembly 10 is utilized at the point of use of the slurry. Specifically, a filter assembly 10 is positioned at the inlet of each of the CMP polishers 60. In such a way, the filtered slurry (i.e., the permeate) exiting the filter assembly 10 is advanced directly to the CMP polisher 60 for use in the polishing process. The concentrated slurry from the filter assembly 10 (i.e., the slurry having particles larger than the filter's cutoff) is circulated back into the tank 58 and will eventually be discarded. As shown in FIG. 5, each of the CMP polishers 60 has a dedicated filter assembly 10. Although only two CMP polishers 60 are shown in FIG. 5, it should be appreciated that any number of filter assemblies 10 may be utilized in the construction of the slurry supply circuit 54 depending on the number of CMP polishers 60 being supplied by the circuit 54.

As described herein, the apparatus and methods of the present disclosure have a number of advantages associated therewith. For example, by use of a microfiltration/ultrafiltration filter, significantly tighter filtration capabilities can be achieved relative to the use of depth filtration devices. As a result, improved operational control of the CMP polishers may be achieved thereby resulting in improved process yields. Moreover, the concepts of the present disclosure lower the operational costs of the fabrication process. In particular, the tangential flow filters described herein need only be replaced every few years of operation as a result of the cross flow arrangement of the filter. Specifically, the large particles do not collect on the filter surface, but rather are flushed off of the filter to a collection tank (i.e., the tote or supply tank). As such, the tangential flow filter does not generally get clogged and therefore is not in regular need of replacement. In the instances that particles do collect of the filter surface, the filter may be cross flowed or reverse flowed to purge the filter without the need to remove the filter from the system.

While the concepts of the present disclosure has been illustrated and described in detail in the drawings and foregoing description, such illustration and description is to be considered as exemplary and not restrictive in character, it being understood that only exemplary embodiments have been shown and described and that all changes and modifications that come within the spirit of the concepts of the present disclosure are desired to be protected.

There are a plurality of advantages of the concepts of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of the apparatus and methods of the present disclosure that incorporate one or more of the features of the present disclosure and fall within the spirit and scope of the invention defined by the appended claims.

What is claimed is:

1. A method of operating a chemical-mechanical polishing system, the method comprising the steps of:
   advancing a polishing slurry through a hollow fiber filter, and
   introducing the polishing slurry onto a wafer polishing surface subsequent to the advancing step.

2. The method of claim 1, wherein the advancing step comprises advancing the polishing slurry through a hollow fiber filter having a cutoff in the range of 0.25–0.75 microns.

3. The method of claim 1, wherein the advancing step comprises advancing the polishing slurry through a hollow fiber filter having a cutoff of approximately 0.25 microns.

4. The method of claim 1, wherein the advancing step comprises advancing the polishing slurry through a hollow fiber filter having a cutoff of approximately 0.75 microns.

5. The method of claim 1, wherein the advancing step comprises advancing the polishing slurry out of a slurry tote and into the hollow fiber filter.

6. The method of claim 1, further comprising the steps of advancing the polishing slurry out of a tote and into a supply tank of a slurry supply circuit, wherein the step of advancing the polishing slurry through the hollow fiber filter comprises advancing the polishing slurry out of the supply tank and through the hollow fiber filter.

7. The method of claim 1, wherein the advancing step comprises advancing the polishing slurry through a hollow fiber ultrafiltration cartridge.

8. The method of claim 1, wherein the advancing step comprises advancing the polishing slurry through a hollow fiber microfiltration cartridge.

9. A polishing slurry supply circuit for a semiconductor wafer fabrication process, the supply circuit comprising a hollow fiber filter.

10. The polishing slurry supply circuit of claim 9, further comprising a slurry supply tank having an outlet fluidly coupled to the hollow fiber filter.

11. The polishing slurry supply circuit of claim 9, further comprising a slurry supply tank having an inlet fluidly coupled to the hollow fiber filter.

12. The polishing slurry supply circuit of claim 9, wherein the hollow fiber filter comprises a hollow fiber ultrafiltration cartridge.

13. The polishing slurry supply circuit of claim 9, wherein the hollow fiber filter comprises a hollow fiber microfiltration cartridge.

14. A method of operating a chemical-mechanical polishing system, the method comprising the steps of:
    advancing a polishing slurry through a tangential flow filter, and
    introducing the polishing slurry onto a wafer polishing surface subsequent to the advancing step.

15. The method of claim 14, wherein the advancing step comprises advancing the polishing slurry through a hollow fiber filter.

16. The method of claim 14, wherein the advancing step comprises advancing the polishing slurry through a tubular filtration module.

17. The method of claim 14, wherein the advancing step comprises advancing the polishing slurry through a tangential flow filter having a pore size in the range of 0.25–0.75 microns.

18. The method of claim 14, wherein the advancing step comprises advancing the polishing slurry through a hollow fiber ultrafiltration cartridge.

19. The method of claim 14, wherein the advancing step comprises advancing the polishing slurry through a hollow fiber microfiltration cartridge.

20. The method of claim 1, wherein the advancing step includes advancing a polishing slurry through a tangential flow hollow fiber filter.

21. The polishing slurry supply circuit of claim 9, wherein the hollow fiber filter includes a tangential flow hollow fiber filter.

* * * * *